United States Patent
Carlie

(10) Patent No.: US 10,099,957 B2
(45) Date of Patent: Oct. 16, 2018

(54) INFRARED TRANSMISSION CHALCOGENIDE GLASSES

(71) Applicant: SCHOTT Corporation, Elmsford, NY (US)

(72) Inventor: Nathan Carlie, Waverly, PA (US)

(73) Assignee: SCHOTT CORPORATION, Elmsford, NY (US)

( * ) Notice: Subject to any disclaimer, the term of this patent is extended or adjusted under 35 U.S.C. 154(b) by 37 days.

(21) Appl. No.: 15/181,774

(22) Filed: Jun. 14, 2016

(65) Prior Publication Data

US 2016/0368813 A1 Dec. 22, 2016

Related U.S. Application Data

(60) Provisional application No. 62/180,904, filed on Jun. 17, 2015.

(51) Int. Cl.
*C03C 3/32* (2006.01)
*C03C 4/10* (2006.01)

(52) U.S. Cl.
CPC .............. *C03C 3/323* (2013.01); *C03C 3/321* (2013.01); *C03C 4/10* (2013.01); *C03C 2203/10* (2013.01)

(58) Field of Classification Search
CPC ................................ C03C 3/321; C03C 3/323
See application file for complete search history.

(56) References Cited

U.S. PATENT DOCUMENTS

| | | |
|---|---|---|
| 5,389,584 A | 2/1995 | Aitken et al. |
| 2009/0270241 A1 | 10/2009 | Aitken |
| 2015/0196898 A1 | 7/2015 | Zhang et al. |

FOREIGN PATENT DOCUMENTS

| | | |
|---|---|---|
| DE | 19813607 | 10/1998 |
| FR | 2771405 | 5/1999 |
| FR | 2992310 | 12/2013 |
| WO | 9933758 | 7/1999 |

OTHER PUBLICATIONS

Zhao et al., "Thermal properties of chalcogenide glasses in the GeSe2—As2Se3—CdSe system", Elsevier, Journal of Non-Crystalline Solids, vol. 354, 2008, pp. 1281-1284.
Extended European Search Report dated Nov. 4, 2016 for corresponding EP16175083.1, 12 pages.

*Primary Examiner* — Elizabeth A. Bolden
(74) *Attorney, Agent, or Firm* — Ohlandt, Greeley, Ruggiero & Perle, L.L.P.

(57) ABSTRACT

A glass composition and a method for producing the glass composition having an improved infrared transmission are provided. The composition includes indium and or cadmium; germanium; phosphorus, arsenic, and/or antimony; silver; lead; and sulfur, selenium, and/or tellurium. The method is performed by melting a mixture for a time period of between about 5 to about 48 hours and mixing the mixture at a temperature range that is between about 600-1000° C.

7 Claims, 2 Drawing Sheets

INFRARED TRANSMISSION CHALCOGENIDE GLASSES

CROSS REFERENCE TO RELATED APPLICATIONS

This application claims the benefit of U.S. Provisional Application Ser. No. 62/180,904, filed Jun. 17, 2015, the entire contents of which are incorporated by reference herein.

BACKGROUND OF THE DISCLOSURE

1. Field of the Disclosure

The present disclosure relates to a glass composition, and a method for producing the glass composition, having an improved infrared transmission. More particularly, the present disclosure relates to improved infrared transmitting chalcogenide glasses having indium and/or cadmium.

2. Field of the Related Art

A chalcogenide is a chemical compound having at least one chalcogen anion and one more electropositive element. Chalcogens include chemical elements in group 16 of the periodic table, the oxygen family, but excluding oxygen itself. Chalcogenide glasses contain chalcogens, generally sulfides, selenides, and tellurides. Many chalcogenide glasses are sulfur-based with arsenic-sulfur (As—S) or germanium-sulfur (Ge—S) bonds. Applications for chalcogenide glasses typically involve the 8-14 µm wavelength range. It is generally observed that ppm levels of oxygen contamination cause reduced transmission. It is believed that this reduced transmission is due to the absorption of light by germanium-oxygen (Ge—O) or arsenic-oxygen (As—O) bonds that form during the melting process for formation of the glass. This, in turn, leads to reduced performance for optical properties or systems that have this glass.

To improve transmission, glass is often processed by distillation with or without the presence of reactive chemicals, such as Al, Mg, $AlCl_3$ or $TeCl_4$. However, the transmission improvement is usually slight. Also, significant cost increases are associated with the complex processing required by this distillation process. Alternately, the glass can be prepared from exceptionally pure raw materials, however this will add to the cost of the batch. Also, these raw materials can be difficult to source, as well as handle in a manner that does not introduce oxygen.

Also, improved IR transmission is important for applications involving thermal imaging, spectroscopy, and $CO_2$ laser transmission, to name a few. In order to achieve sufficient transmission, soft hygroscopic and toxic crystalline materials are often used. However, such materials are also limited in terms of fabrication methods that can be used, namely fiber drawing and lens molding.

FIG. 1 shows the prior art arsenic-selenium (As—Se) glass. In this prior art glass, there occurs arsenic-oxygen (As—O) bonds with absorption near 14 µm. The presence of germanium (Ge) in germanium-arsenic-selenium (Ge—As—Se) glass or germanium-antimony-selenium (Ge—Sb—Se) glass results in germanium-oxygen (Ge—O) bonds and absorption (i.e., a drop in transmittance) near 12.5 µm. The difference in wavelengths for these absorption features, shown in FIG. 1, is due to the frequency of the bond vibration that is a function of bond strength divided by the atomic mass of the atoms. Thus, a metal with lower bond energy and with oxygen or higher atomic mass will result in a lower frequency vibration and longer wavelengths for the absorption.

Thus, there is a need to increase the transmission of typical glass in order to address new applications that are not otherwise suitable for traditional glass or crystals.

BRIEF SUMMARY OF THE PRESENT DISCLOSURE

The present disclosure provides a chalcogenide glass having improved infrared transmission.

The present disclosure also provides such chalcogenide glass for use in glasses in the long wavelength infrared range of 8 µm to 15 µm over commercially available glasses.

The present disclosure further provides such chalcogenide glasses that have indium (In), cadmium (Cd), or a combination of both.

The present disclosure yet further provides such chalcogenide glasses that can be sulfur (S), selenium (Se), or tellurium (Te) based.

The present disclosure still further provides a method for producing such chalcogenide glass.

DETAILED DESCRIPTION OF THE DISCLOSURE

Figure 1:
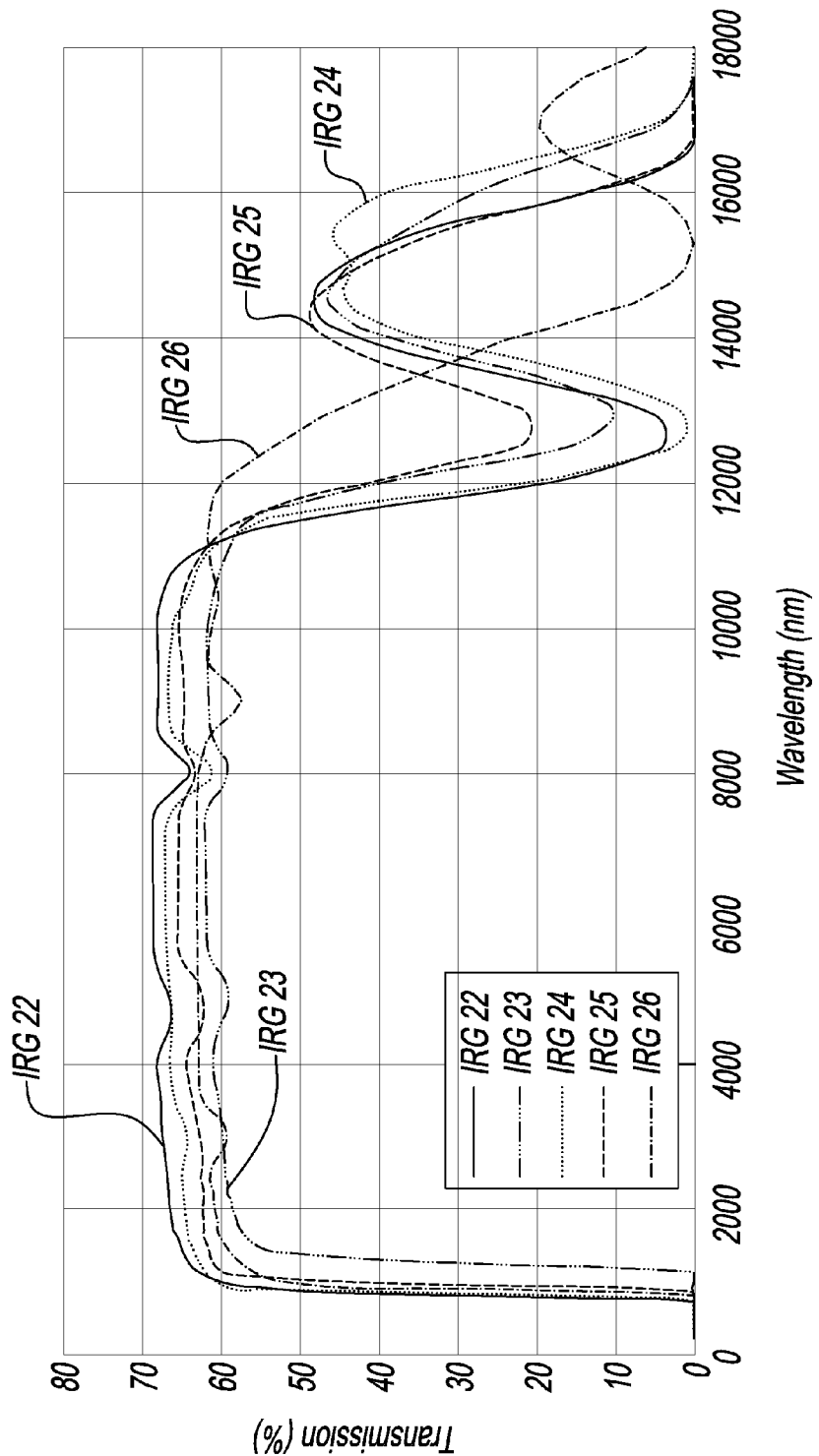
FIG. 1 is a plot of comparing transmission percentage of various commercial (prior art) glasses at a given wavelength.

The present disclosure provides for glass for use in glasses that have an improved transmission in the long wavelength infrared (IR) range. Further, the improved transmission is in the 8 µm to 15 µm range over present, commercially available glasses.

The glasses of the present disclosure are chalcogenide glasses. Thus, the present glasses have chemical elements in group 16 of the periodic table. Although Oxygen is in group 16, oxygen itself is not a chalcogenide. These chalcogenide glasses also have cadmium, indium, or a combination thereof, to increase transmission. The chalcogenide glasses of the present disclosure can be sulfur (S), selenium (Se), or tellurium (Te) based.

For elements of interest in forming chalcogenide glasses, such as late-transition and post-transition metals ($d^{10}$ ions) and metalloids, the electronegativity tends to increase with atomic mass. Of these elements, only indium and cadmium possess the ability to form a large part of a chalcogenide glass combined with high atomic mass and low electronegativity. The addition of these two elements to a chalcogenide glass leads to the preferential formation of cadmium-oxygen (Cd—O) or indium-oxygen (In—O) bonds over germanium-oxygen (Ge—O) that have frequencies in the 250-300 $cm^{-1}$ range that correspond to wavelengths of 30-40 µm. Alkaline, alkaline-earth and rare-earth elements have low electronegativity and can have high mass. However, these elements are ionic, have low solubility, and do not act to preferentially bind oxygen (O). The addition of these elements into sulfide, selenide and telluride glass results in the removal of oxide impurity absorption bands and restoration of the fundamental glass transmission range, typically 12 µm for sulfide, 16 µm for selenide, and 20 µm for telluride glass.

The addition of indium (In), cadmium (Cd), or both, to the glass increases significantly the transmission of the glass. While not being bound by any theory, it is believed that the improved transmission arises from the combination of low electronegativity and high atomic mass indium (In), cadmium (Cd). It is further believed that the oxygen (O) will preferably bond to elements of the glass having lowest electronegativity, i.e the Cd In which also gives the highest possible metal-oxygen bond strength.

In a first embodiment, the chalcogenide glass has no cadmium (Cd). In this embodiment, the amount of indium (In) is between about 2% to about 20%, and more preferably, between about 5% to about 15%, of the total weight of the glass.

In a second embodiment, the chalcogenide glass has no indium (In). In this embodiment, cadmium (Cd) is present in an amount between about 0.5% to about 10% and, more preferably, between about 2% to about 5%.

In a third embodiment in which the chalcogenide glass has cadmium (Cd) and indium (In), the amount of cadmium (Cd) is between about 0.5% and about 10% and the amount of indium (In) is between about 5% and about 10%. More preferably, the amount of cadmium (Cd) is between about 2% and about 5% and the amount of indium (In) is between about 5% and about 10%.

In each of these three embodiments set forth above, the remainder of the composition is between about 10% to about 30% germanium (Ge); between about 2% to about 40% of phosphorus (P), arsenic (As) and/or antimony (Sb); 0% to about 10% lead (Pb); 0% to about 20% silver (Ag); and about 30% to about 80% of one or more of the chalogens, sulfur (S), selenium (Se) and/or tellurium (Te).

In each of the three embodiments described above, the remainder of the composition is alternatively comprised of at least about 5% of germanium (Ge) and at least about 1% of (P), arsenic (As) or antimony (Sb). These elements prevent the formation of crystals from the melt during cooling in the glass formation process.

Optionally, in each of the three embodiments, each composition can have between about 7% to about 25% of a halide. The halide can include, but not be limited to, chlorine (Cl), bromine (Br), or iodine (I).

As a further option, each of the three embodiments can have between about 5% to about 20% of an alkali. The alkali can include, but not be limited to, potassium (K), rubidium (Rb), or cesium (Cs).

In addition to the three embodiments discussed above, the present disclosure further provides other embodiments. For example, in two other embodiments, namely fourth and fifth embodiments, each embodiment has indium (In). Generally, indium (In) is preferable in glass compositions (and methods of making same) as compared to cadmium (Cd), since indium (In) has lower toxicity, higher glass stability, and a wider array of compositions in which it can be used.

The fourth embodiment is a gallium sulfide ($Ga_2S_3$) lanthium sulfide ($La_2S_3$) based chalcogenide glass composition. The fifth embodiment is a gallium selenide (GaSe) lanthium selenide (LaSe) based chalcogenide glass composition. In each of these embodiments, the gallium (Ga) increases the solubility of ionic species, such as alkaline and rare-earth elements, in chalcogenide glass.

In these fourth and fifth embodiments, indium (In) can be substituted for gallium (Ga) to improve infrared transmission however there is some reduction of the ionic solubility. For example, indium (In) can be substituted for up to 50% for arsenic (As), antimony (Sb) or gallium (Ga) in sulfide based glass. Indium (In) can also be substituted up to 100% for arsenic (As), antimony (Sb) or gallium (Ga) in selenide based glass. This latter substitution and effect is not possible with cadmium (Cd).

The fourth embodiment provides a gallium sulfide ($Ga_2S_3$) lanthium sulfide ($La_2S_3$) based chalcogenide glass composition. In this fourth embodiment, indium (In) is present between about 0.1% to about 50%, gallium sulfide ($Ga_2S_3$) is present between about 20% to about 80%, and lanthium sulfide ($La_2S_3$) is present between about 15% to about 35%. In this fourth embodiment, the combination of gallium sulfide ($Ga_2S_3$) and indium (In) does not exceed 80% of the total composition.

The fifth embodiment of gallium selenide (GaSe) lanthium selenide (LaSe) based chalcogenide glass composition, indium (In) is present between about 0.1% to about 80% and lanthium selenide (LaSe) is present between about 15% to about 35%. In this fifth embodiment, gallium selenide (GaSe) is optional because up to 100% of the gallium (Ga) can be substituted with indium (In). However, gallium selenide (GaSe) can be present in an amount up to about 80%, with the remainder being indium (In), such that the combination of gallium selenide (GaSe) and indium (In) does not exceed about 80% of the composition.

Examples 1 through 8 below are compositions according to the first embodiment, in which indium (In) is present, but there is no cadmium (Cd). These Examples encompass the first, third, fourth and fifth embodiments, but not the second embodiment.

Example 1

| Composition | Percent (%) Total Weight of Glass |
|---|---|
| indium (In) | between about 2-20% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | Between about 50-80%. |

Example 2

| Composition | Percent (%) Total Weight of Glass |
|---|---|
| indium (In) | between about 5-15% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |

Example 3

| Composition | Percent (%) Total Weight of Glass |
|---|---|
| indium (In) | between about 2-20% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |

-continued

| Composition | Percent (%) Total Weight of Glass |
|---|---|
| sulfur (S), selenium (Se), and/or tellurium (Te) | between about 30-80% |
| chlorine (Cl), bromine (Br), and/or iodine(I) | between about 7-25% |

Example 4

| Composition | Percent (%) Total Weight of Glass |
|---|---|
| indium (In) | between about 5-15% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| chlorine (Cl), bromine (Br), and/or iodine(I) | between about 7-25% |

Example 5

| Composition | Percent (%) Total Weight of Glass |
|---|---|
| indium (In) | between about 2-20% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |
| potassium (K), rubidium (Rb), or cesium (Cs) | between about 5-20% |

Example 6

| Composition | Percent (%) Total Weight of Glass |
|---|---|
| indium (In) | between about 5-15% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |
| potassium (K), rubidium (Rb), or cesium (Cs) | between about 5-20% |

Example 7

| Composition | Percent (%) Total Weight of Glass |
|---|---|
| indium (In) | between about 2-20% |
| germanium (Ge) | between about 10-30% |
| phosphorus (P), arsenic (As), and/or antimony (Sb) | between about 2-40% |

-continued

| Composition | Percent (%) Total Weight of Glass |
|---|---|
| silver (Ag) | at most about 20% |
| lead (Pb) | at most about 10% |
| sulfur (S), selenium (Se), and/or tellurium (Te) | between about 30-80% |
| potassium (K), rubidium (Rb), or cesium (Cs) | between about 5-20% |
| chlorine (Cl), bromine (Br), and/or iodine(I) | between about 7-25% |

Example 8

| Composition | Percent (%) Total Weight of Glass |
|---|---|
| indium (In) | between about 5-15% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| potassium (K), rubidium (Rb), or cesium (Cs) | between about 5-20% |
| chlorine (Cl), bromine (Br), and/or iodine(I) | between about 7-25% |

Examples 9 through 16 below are compositions according to the second embodiment, in which there is cadmium (Cd), but no indium (In).

Example 9

| | Percent (%) Total Weight of Glass |
|---|---|
| cadmium (Cd) | between about 0.5-10% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |

Example 10

| | Percent (%) Total Weight of Glass |
|---|---|
| cadmium (Cd) | between about 2-5% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |

Example 11

| Composition | Percent (%) Total Weight of Glass |
|---|---|
| cadmium (Cd) | between about 0.5-10% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| chlorine (Cl), bromine (Br), and/or iodine (I) | between about 7-25% |

Example 12

| Composition | Percent (%) Total Weight of Glass |
|---|---|
| cadmium (Cd) | between about 2-5% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| chlorine (Cl), bromine (Br), and/or iodine (I) | between about 7-25% |

Example 13

| Composition | Percent (%) Total Weight of Glass |
|---|---|
| cadmium (Cd) | between about 0.5-10% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |
| potassium (K), rubidium (Rb), or cesium (Cs) | between about 5-20% |

Example 14

| Composition | Percent (%) Total Weight of Glass |
|---|---|
| cadmium (Cd) | between about 2-5% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |
| potassium (K), rubidium (Rb), or cesium (Cs) | between about 5-20% |

Example 15

| Composition | Percent (%) Total Weight of Glass |
|---|---|
| cadmium (Cd) | between about 0.5-10% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| potassium (K), rubidium (Rb), or cesium (Cs) | between about 5-20% |
| chlorine (Cl), bromine (Br), and/or iodine (I) | between about 7-25% |

Example 16

| Composition | Percent (%) Total Weight of Glass |
|---|---|
| cadmium (Cd) | between about 2-5% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| potassium (K), rubidium (Rb), or cesium (Cs) | between about 5-20% |
| chlorine (Cl), bromine (Br), and/or iodine (I) | between about 7-25% |

Examples 17 through 32 below are compositions according to the third embodiment, in which there is both indium (In) and cadmium (Cd).

Example 17

| Composition | Percent (%) Total Weight of Glass |
|---|---|
| cadmium (Cd) | between about 2-5% |
| indium (In) | between about 2-20% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |

Example 18

| Composition | Percent (%) Total Weight of Glass |
|---|---|
| cadmium (Cd) | between about 2-5% |
| indium (In) | between about 5-15% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |

Example 19

| Composition | Percent (%) Total Weight of Glass |
|---|---|
| cadmium (Cd) | between about 2-5% |
| indium (In) | between about 2-20% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| chlorine (Cl), bromine (Br), and/or iodine(I) | between about 7-25% |

Example 20

| Composition | Percent (%)Total Weight of Glass |
|---|---|
| cadmium (Cd) | between about 2-5% |
| indium (In) | between about 5-15% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| chlorine (Cl), bromine (Br), and/or iodine(I) | between about 7-25% |

Example 21

| Composition | Percent (%) Total Weight of Glass |
|---|---|
| cadmium (Cd) | between about 2-5% |
| indium (In) | between about 2-20% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |
| potassium (K), rubidium (Rb), or cesium (Cs) | between about 5-20% |

Example 22

| Composition | Percent (%) Total Weight of Glass |
|---|---|
| cadmium (Cd) | between about 2-5% |
| indium (In) | between about 5-15% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |
| potassium (K), rubidium (Rb), or cesium (Cs) | between about 5-20% |

Example 23

| Composition | Percent (%) Total Weight of Glass |
|---|---|
| cadmium (Cd) | between about 2-5% |
| indium (In) | between about 2-20% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| potassium (K), rubidium (Rb), or cesium (Cs) | between about 5-20% |
| chlorine (Cl), bromine (Br), and/or iodine(I) | between about 7-25% |

Example 24

| Composition | Percent (%)Total Weight of Glass |
|---|---|
| cadmium (Cd) | between about 2-5% |
| indium (In) | between about 5-15% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| potassium (K), rubidium (Rb), or cesium (Cs) | between about 5-20% |
| chlorine (Cl), bromine (Br), and/or iodine(I) | between about 7-25% |

Example 25

| Composition | Percent (%) Total Weight of Glass |
|---|---|
| cadmium (Cd) | between about 0.5-10% |
| indium (In) | between about 2-20% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |

Example 26

| Composition | Percent (%) Total Weight of Glass |
|---|---|
| cadmium (Cd) | between about 0.5-10% |
| indium (In) | between about 5-15% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |

Example 27

| Composition | Percent (%) Total Weight of Glass |
|---|---|
| cadmium (Cd) | between about 0.5-10% |
| indium (In) | between about 2-20% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| chlorine (Cl), bromine (Br), and/or iodine(I) | between about 7-25% |

Example 28

| Composition | Percent (%) Total Weight of Glass |
|---|---|
| cadmium (Cd) | between about 0.5-10% |
| indium (In) | between about 5-15% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| chlorine (Cl), bromine (Br), and/or iodine(I) | between about 7-25% |

Example 29

| Composition | Percent (%) Total Weight of Glass |
|---|---|
| cadmium (Cd) | between about 0.5-10% |
| indium (In) | between about 2-20% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |
| potassium (K), rubidium (Rb), or cesium (Cs) | between about 5-20% |

Example 30

| Composition | Percent (%) Total Weight of Glass |
|---|---|
| cadmium (Cd) | between about 0.5-10% |
| indium (In) | between about 5-15% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 50-80% |
| potassium (K), rubidium (Rb), or cesium (Cs) | between about 5-20% |

Example 31

| Composition | Percent (%) Total Weight of Glass |
|---|---|
| cadmium (Cd) | between about 0.5-10% |
| indium (In) | between about 2-20% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| potassium (K), rubidium (Rb), or cesium (Cs) | between about 5-20% |
| chlorine (Cl), bromine (Br), and/or iodine(I) | between about 7-25% |

Example 32

| Composition | Percent (%) Total Weight of Glass |
|---|---|
| cadmium (Cd) | between about 0.5-10% |
| indium (In) | between about 5-15% |
| germanium (Ge) | between about 10-30% |
| phosphorus (P), arsenic (As), and/or antimony (Sb) | between about 2-40% |
| silver (Ag) | at most about 20% |
| lead (Pb) | at most about 10% |
| sulfur (S), selenium (Se), and/or tellurium (Te) | between about 30-80% |
| potassium (K), rubidium (Rb), or cesium (Cs) | between about 5-20% |
| chlorine (Cl), bromine (Br), and/or iodine(I) | between about 7-25% |

The glass, and glasses formed therefrom, of the present disclosure are preferably prepared by melting a mixture of the raw elements or binary halide and/or chalcogenide compounds for a period of from 5 to 48 hours, preferably from 10 to 20 hours. The glass can be melted in a sealed container, such as a fused quartz ampoule, or in an open crucible, under controlled atmosphere and the liquid glass melt can be mixed via rocking or stirring. The mixing occurs in a temperature range of 600° C. to 1000° C., preferably in the temperature range of 850° C. to 1000° C.

Without being bound by a particular theory, it is believed that in the temperature range of 700° C. to 1000° C., the oxygen (O) atoms are effectively transferred from germanium-oxygen (Ge—O) to indium-oxygen (In—O) and/or cadmium-oxygen (Cd—O) bonds. Less indium (In) or cadmium (Cd) are needed to achieve comparable optical properties when melted at higher temperatures than the same composition melted at lower temperatures. Thus, by melting at higher temperatures in the ranges according to the present disclosure, the indium (In) content can be reduced to as low as 2% while still achieving effective removal of oxygen (O) impurities.

It is also believed that there is also a kinetic component to the impurity removal process. Thus, at least six (6) hours is needed when the indium (In) content is 10%. It appears that there is an increased efficiency when a lower indium (In) content is present if the melt time is longer than twelve (12) hours.

Using long or longer melt times as a method for remediation of transmission of indium-free compositions results in the absence of a significantly altered refractive index or other adverse effects on the composition properties. This is particularly useful for compositions that do not have germanium (Ge), as the solubility for indium (In) in the glass is low, causing crystal formation.

Under such longer processing, notwithstanding the above discussed compositions and ranges, it is also possible to use indium (In) as a dopant if the indium (In) is in an amount under about 2%, more preferably, under about 1%. In such an embodiment, the impact on infrared transmission can be significant, but less in magnitude than the embodiments having more than about 2% indium (In).

Figure 2:
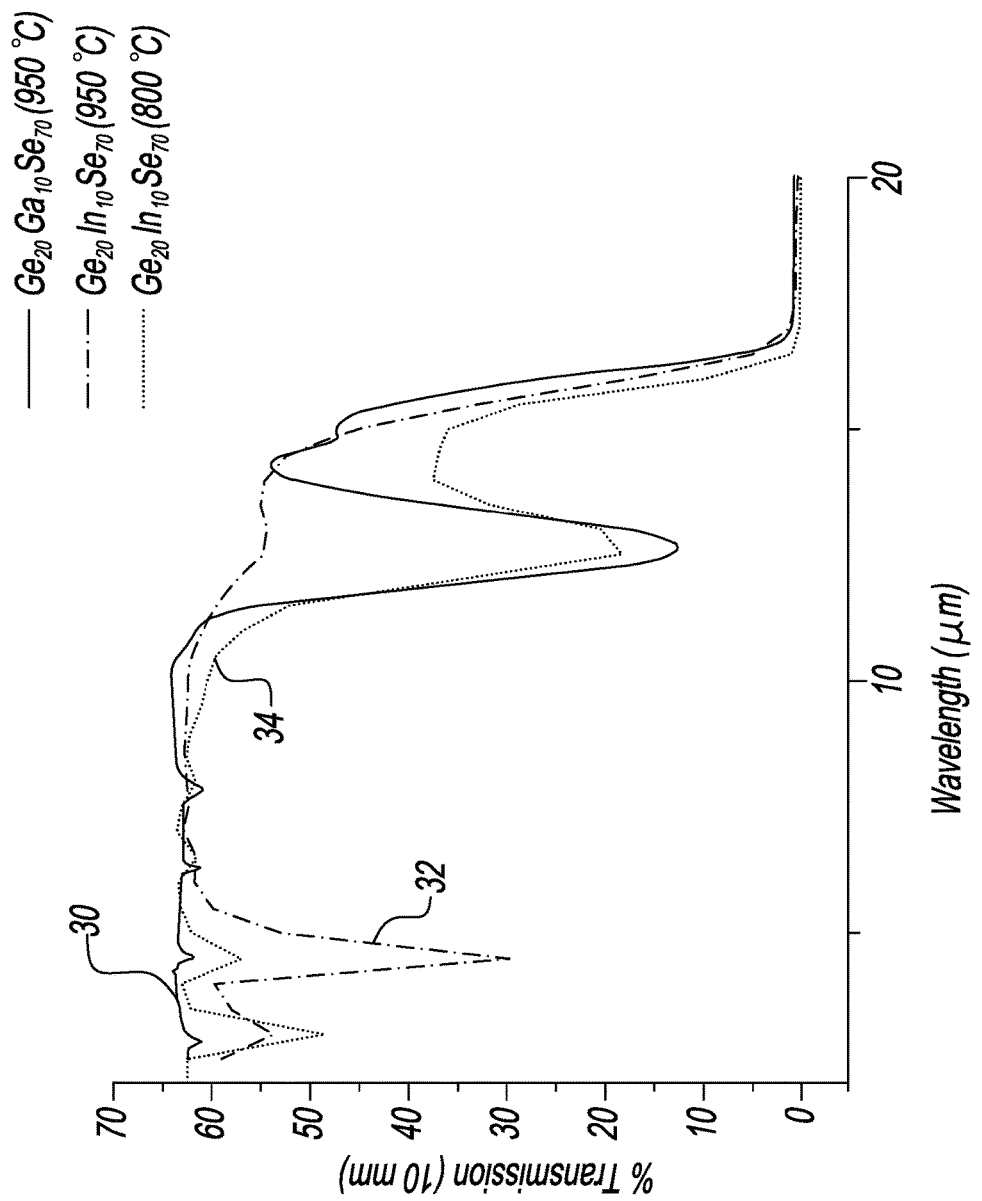
FIG. 2 is a plot of comparing transmission percentage at a given wavelength for germanium-galium-selenium (Ge—Ga—Se) and germanium-indium-selenium (Ge—In—Se).

Referring to FIG. 2, there is shown a graph of the percent transmission on the vertical axis and wavelength on the horizontal axis for $Ge_{20}In_{10}Se_{70}$ that has been melted at different temperatures and times. The red line, reference numeral 30, is 950° C. for 4 hours, the blue line, reference numeral 32, is 950° C. for 12 hours and the black line, reference numeral 34, is 800° C. This graph shows that, in addition to indium (In), a longer time at a higher temperature is necessary to fully bind oxygen.

Applications for the glasses of the present disclosure include, but are not limited to, thermal imaging, night vision systems, motion control systems, spectroscopy, $CO_2$ laser transmission, optical sensor systems based on thin films, and infrared transmitting optical fibers.

As used in this application, the word "about" for dimensions, weights, amounts, and other measures means a range that is ±10% of the stated value, more preferably ±5% of the stated value, and most preferably ±1% of the stated value, including all subranges therebetween.

It should be noted that where a numerical range is provided herein, unless otherwise explicitly stated, the range is intended to include any and all numerical ranges or points within the provided numerical range and including the endpoints. Thus, the word "between" is intended to include endpoints.

It should also be noted that the terms first, second, third, and the like may be used herein to modify various elements. These modifiers do not imply a sequential or hierarchical order to the modified elements unless specifically stated.

Although described herein with reference to one or more exemplary embodiments, it will be understood by those skilled in the art that various changes can be made and equivalents can be substituted for elements thereof without departing from the scope of the present disclosure. In addition, many modifications can be made to adapt a particular situation, construction, operation, or material to the teachings of the disclosure without departing from the scope thereof. Therefore, it is intended that the present disclosure not be limited to the particular embodiment(s) disclosed as the best mode contemplated, but that the disclosure will include all embodiments falling within the spirit and scope of the appended claims.

What is claimed is:

1. A chalcogenide glass composition, the composition consisting essentially of, in percent by weight of the total weight of the composition:
   indium in an amount from about 2% to about 20%;
   germanium in an amount from about 10% to about 30%;
   at least one element selected from the group consisting of phosphorus, arsenic, and antimony, wherein the at least one element is in an amount from about 2% to about 40%;
   and
   at least one chalcogen selected from the group consisting of: sulfur, selenium, and tellurium, wherein the at least one chalcogen is in an amount from about 30% to about 80%.

2. The composition of claim 1, wherein the indium is in an amount from about 5% to about 15%.

3. The composition of claim 1, wherein the at least one chalcogen is in an amount from about 50% to about 80%.

4. The composition of claim 1, wherein the composition is prepared by mixing in a temperature range from about 850° C. to 1000° C.

5. A chalcogenide glass composition, the composition consisting essentially of, in percent by weight of the total weight of the composition:
   indium in an amount from about 2% to about 20%;
   germanium in an amount from about 10% to about 30%; and
   at least one chalcogen selected from the group consisting of: sulfur, selenium, and tellurium, wherein the at least one chalcogen is in an amount from about 50% to about 80%.

6. The composition of claim 5, wherein the composition is prepared by mixing in a temperature range that is between about 850° C. to 1000° C.

7. A chalcogenide glass composition, the composition consisting essentially of, in percent by weight of the total weight of the composition:
   indium in an amount from about 2% to about 20%;
   germanium in an amount from about 10% to about 30%;
   at least one element selected from the group consisting of phosphorus, arsenic, and antimony, wherein the at least one element is in an amount from about 2% to about 40%;
   at least one chalcogen selected from the group consisting of: sulfur, selenium, and tellurium, wherein the at least one chalcogen is in an amount from about 30% to about 80%; and
   at least one halide selected from the group consisting of: chlorine, bromine, and iodine, wherein the at least one halide is in an amount from about 7% to about 25%.

* * * * *